Figure 1:
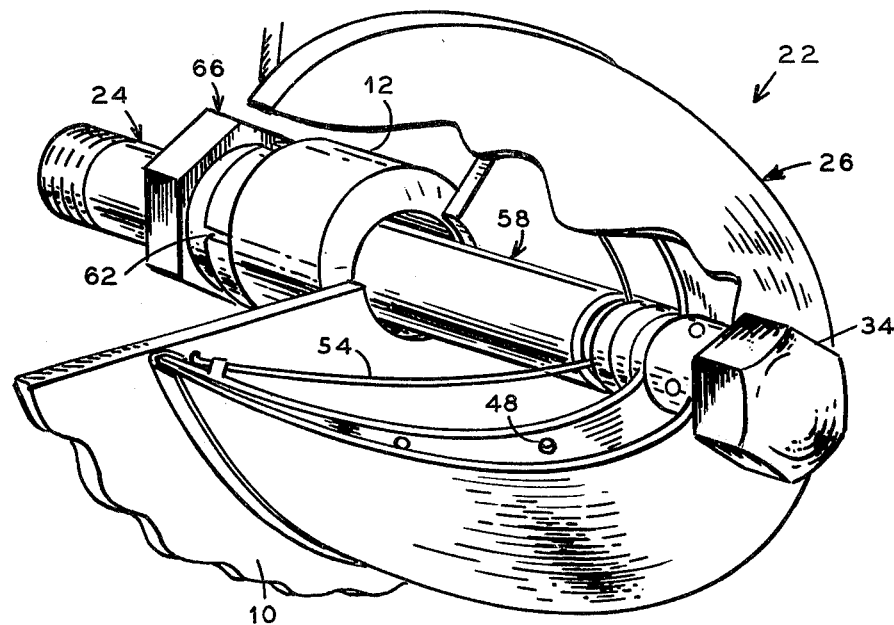

United States Patent [19]
Hallenbeck et al.

[11] 3,994,429
[45] Nov. 30, 1976

[54] PURGE UNIT FOR WELDING APPARATUS

[76] Inventors: Emerson J. Hallenbeck, 2934 Shoreland Ave., Toledo, Ohio 43611; Donald C. Boucher, 1225 N. Roessler, Monroe, Mich. 48161

[22] Filed: July 21, 1975

[21] Appl. No.: 597,363

[52] U.S. Cl. ................................. 228/57; 219/74; 85/3 R; 220/239
[51] Int. Cl.² ........................................ B23K 37/00
[58] Field of Search .......... 228/57, 219; 219/137 R, 219/72, 74, 75; 432/23, 255; 85/3 R; 220/239

[56] References Cited
UNITED STATES PATENTS

| | | | |
|---|---|---|---|
| 1,353,813 | 9/1920 | Hughes | 249/83 |
| 2,481,013 | 9/1949 | Henderson | 220/239 X |
| 2,802,092 | 8/1957 | Hauck | 219/137 R X |
| 2,805,316 | 9/1957 | Chapman | 219/72 |
| 3,232,207 | 2/1966 | Gibbons | 220/239 X |
| 3,292,254 | 12/1966 | Sloan | 228/219 |
| 3,338,499 | 8/1967 | Gilbert | 228/219 X |
| 3,736,400 | 5/1973 | Spiegel et al. | 219/74 X |
| 3,754,115 | 8/1973 | Roberts et al. | 219/74 X |

*Primary Examiner*—Al Lawrence Smith
*Assistant Examiner*—K. J. Ramsey
*Attorney, Agent, or Firm*—Allen D. Gutchess, Jr.

[57] ABSTRACT

The invention provides a purge unit for establishing a closed zone for an inert gas around a weld area. The purge unit is particularly adapted for use where a branch pipe is welded to a main pipe or header. The purge unit is inserted into an opening in the header and is then expanded to establish the closed zone around the inside of the weld area. An inert gas, in a volume much less than otherwise required, is then supplied through the unit into the zone to cover or blanket the inside of the weld area. After the weld is complete, the purge unit can be collapsed and withdrawn through the opening so as not to leave any material within the header which might cause contamination.

18 Claims, 2 Drawing Figures

U.S. Patent     Nov. 30, 1976     3,994,429

PURGE UNIT FOR WELDING APPARATUS

This invention relates to a purge unit for establishing an enclosed zone for an inert gas around a weld area.

In the welding of stainless steel and other alloy metals, the weld area must be out of contact with air or any form of oxygen and blanketed with an inert gas. Otherwise, the metal of the weld area tends to oxidize or "sugar" which produces micro-cracks and an unsatisfactory weld.

In some installations, such as nuclear plants, it is common for a branch connection to be made in an existing main pipe or header at a later time after the header is otherwise complete. In such an instance, the entire header must be purged, which not only requires a considerable volume of purge or inert gas, but also a substantial amount of time to assure that the purge gas has removed all impurities inside the header. Argon or helium is frequently used as a purge gas and these are very costly. In some instances, particularly where quantities of moisture are concerned, nitrogen is used as the purge gas. This is less expensive but considerable time is still required to assure that all moisture and contaminants are removed from the entire header prior to welding the branch connection.

In accordance with the invention, an expandable, cone-shaped purge unit is provided which establishes an enclosed zone inside the header around the weld area into which the inert gas is supplied. With this unit, only a fraction of the inert gas otherwise required need be employed and the time to assure the purging is complete is also substantially reduced.

An opening is made in the header at the position where the branch connection is to be welded, with the size of the opening usually being about the size of the internal passage in the branch connection. The connection is then aligned with the opening and the new purge unit inserted through the connection and the opening into the header. The unit includes an expandable, cone-shaped member connected to an elongate member. When the cone-shaped member is moved into the header, it is expanded with its peripheral edge engaging the inner surface of the header and an inert gas is supplied through the elongate member into the enclosed zone established by the cone-shaped member. The elongate member is also suitably sealed with respect to the branch connection. After the weld is complete, the cone-shaped member can be collapsed against the elongate member and withdrawn through the opening and the branch connection so as not to leave any materials in the header which might otherwise cause contamination.

It is, therefore, a principal object of the invention to provide a purge unit to enable a weld area to be purged faster and with less inert gas.

Another object of the invention is to provide a purge unit for establishing an enclosed zone around a weld area on one side thereof.

Yet another object of the invention is to provide a purge unit for insertion through a branch connection into a header when the branch connection is to be welded thereto.

Figure 2:
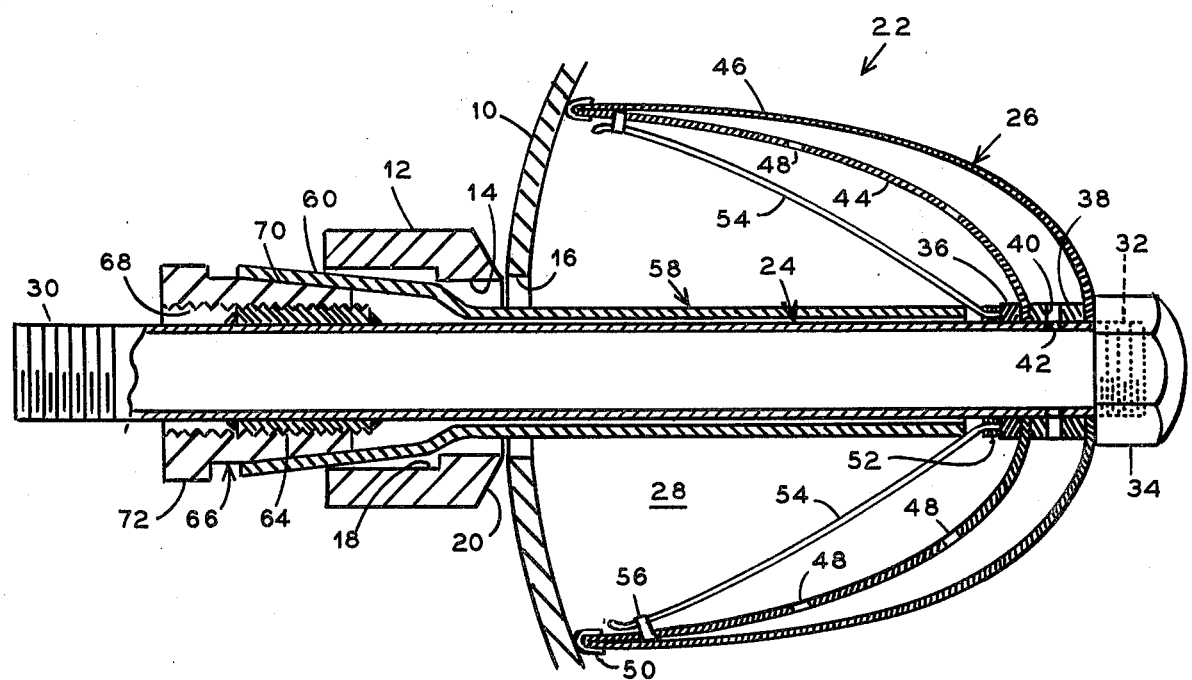

Many other objects and advantages of the invention will be apparent from the following detailed description of preferred embodiments thereof, reference being made to the accompanying drawings, in which:

FIG. 1 is a somewhat schematic view in perspective of a purge unit embodying the invention, with parts broken away and with parts in section; and FIG. 2 is a somewhat schematic view in longitudinal cross section taken through the purge unit, a header, and a branch connection of FIG. 1.

Referring to the drawings, a wall 10 of a main pipe or header has a branch line or connection 12 to be affixed thereto. The branch connection 12, in this instance, is in the form of a female coupling to receive a branch line or pipe after the coupling is welded to the header. The coupling 12 has an inner passage 14 of a diameter substantially equal to the diameter of an opening 16 made in the header wall 10 and the coupling has a larger outer diameter 18 into which the branch pipe or line will subsequently be inserted and affixed. The coupling also has a beveled end 20 which is welded to the header wall in a manner known in the art. Typically, by way of example, the header may have a diameter in a widely varying range of sizes with the branch line having a diameter from ½ to 12 inches. The branch connection 12 can also be of a wide variety of shapes with different female or male connections.

Heretofore, in order to weld the connection 12 to the weld 10, the inner surface of the weld area had to be purged where stainless steel and other alloy steels were employed, with the header 10 usually requiring purging throughout its entire length. This resulted in consumption of considerable volumes of gas and required considerable time for purging to assure that all contaminants were removed throughout the header by the purge gas.

In accordance with the invention, an enclosed zone is established within the header 10 which has a volume only a fraction of that of the entire header, with the result that only a small fraction of the gas otherwise required is employed, producing considerable savings in the cost of the gas and the time required for purging prior to welding. A purge unit 22, in accordance with the invention, includes an elongate member or pipe 24 carrying an expandable, cone-shaped member 26. Basically, in the operation of the purge unit 22, the elongate member 24 and the cone-shaped member 26 are inserted through the connection 12 and the opening 16 until the cone-shaped member is entirely within the header. The member 26 is then expanded to form an enclosed zone 28 around the weld area adjacent the opening 16. Purge gas is then supplied through the pipe 24 into the zone 28. After the connection 12 is welded to the header wall 10 in the usual manner, the cone-shaped member 26 is collapsed around the pipe 24 and withdrawn with the pipe through the opening 16 and the passages 14 and 18 of the now-welded connection 12.

Referring now in more detail to the components of the unit 22, the pipe 24 has an outer threaded end 30 to which a suitable supply line from a source of purge or inert gas is connected to supply the purge gas through the interior of the pipe 24. The pipe 24 also has an inner threaded end 32 which receives a threaded nut 34. A stop flange or washer 36 is formed on or affixed to the pipe 24 at a point spaced from the threaded end 32. For this purpose, the washer can be welded to the pipe or otherwise suitably affixed. A spacer ring 38 having ports 40 is located on the pipe 24 between the threaded end 32 and the flange 36. The ports 40 communicate with ports 42 in the pipe 24 and to assure communication between the ports, the spacer ring 38 can have an inner annular groove formed therein.

The cone-shaped member 26 has an inner wall 44 and an outer wall 46. The inner wall 44 has an opening through which the pipe 24 extends with the inner wall 44 abutting the stop flange 36. The spacer ring 38 is received on the pipe 24 adjacent the inner wall 44 and the outer wall 46 has an opening through which the pipe 24 extends with the outer wall being between the spacer ring 38 and the end nut 34. The spacer ring 38 can be assembled with the cone-shaped member 22 prior to assembly with the pipe. When the nut 34 is turned on the threaded end 32 to affix the cone-shaped member 26 to the pipe 24, the inner wall 44 is held between the stop flange 36 and one end of the spacer ring 38 and the outer wall 46 is affixed between the other end of the spacer ring 38 and the nut 34.

The cone-shaped member 26 has openings 48 in the inner wall 44 which communicate with the enclosed zone 28 whereby purge gas supplied through the pipe 24 can enter the ports 42 and 40, move between the walls 44 and 46 of the member 26 and enter the enclosed zone through the ports 48.

Typically, by way of example, the periphery of the member 26 will lie from one-half inch to three-quarter inch from the weld area and considerable heat can still be experienced from the weld at this area at this line of contact of the cone-shaped member with the header. Therefore, the periphery of the cone-shaped member 26 preferably has a flexible flange 50 of heat-resistant material affixed thereto. This material can be an asbestos tape which is commercially available, by way of example. The flexible flange 50 thus prevents damage to the cone-shaped member 26 from the heat of the weld. Further, the flexible flange 50 enables the periphery of the cone-shaped member 26 to conform more fully with the inner cylindrical surface of the header wall 10. Particularly with large diameter headers, the flange 50 will enable the periphery of the cone-shaped member 26 to substantially fully engage the inner surface of the header wall. With smaller diameter headers, it may be desirable to specially shape the peripheral edge of the cone-shaped member 26 to conform more fully to the inner surface of the header wall. For this purpose, the edge of the cone-shaped member would not be a circle, but would be longer at the portions extending horizontally outwardly from the opening 16 to accommodate the contour of the header more fully. It is not essential that a completely gas-tight engagement or contact be achieved between the member 26 and the header wall 10 since slight leakage of the purge gas from the zone 28 would not affect the weld, although slightly more gas might be required.

On the side of the stop flange 36 toward the outer end of the pipe 24 is a retaining or mounting ring 52 having a plurality of resilient spring wires 54 affixed thereto and extending, in their unstressed position, along the pipe 24 and substantially parallel thereto. For this purpose, the ring 52 can have a plurality of transverse holes drilled therein, one for each of the wires 54 with the wires then being inserted and silver-soldered in the ring. The outer ends of the spring wires 54 are affixed to the inner wall 44 of the cone-shaped member 26 by suitable loops 56.

An actuating and sealing sleeve 58 is slidably mounted on the pipe 24. The sleeve 58 has an outer flared end 60 having longitudinally-extending slots 62 (FIG. 1) to enable the flared end 60 to expand. A threaded sleeve 64 with a running thread is affixed to the pipe 24, as by welds, in the area near the flared end 60 of the sleeve 58. A collar nut 66 has an internal thread 68 received on the threaded sleeve 64. The collar nut 66 has an outer cone-shaped surface 70 which engages the internal surface of the flared end 60 to force it outwardly against the inner passage 18 of the connection 12. For this purpose, the collar nut 66 has an outer noncircular flanged end 72 which can be engaged by a wrench to turn the collar nut 66 on the threaded sleeve 64. When the flared end 60 of the sleeve 58 is forced outwardly, it forms a substantially gas-tight seal between the unit 22 and the connection 12. The sleeve 58 not only provides an outer seal for the unit, but its inner end forms the function of forcing outwardly the spring wires 54 which thereby also expand outwardly the cone-shaped member 26 to its operating position, as shown in the drawing. The purge gas supplied through the interior of the cone-shaped member 26 also helps to inflate this member and expand it outwardly, even if the wires 54 are employed. However, the wires 54 perform a function of collapsing the cone-shaped member 26 after the weld is complete. Thus, when the weld is complete and the sleeve 58 is withdrawn, the wires 54 move back substantially parallel to the pipe 24 to their unstressed positions and collapse the cone-shaped member 26 with them. The unit 22 can then be withdrawn through the opening 16 and the welded connection 12.

The operation of the unit 22 will be apparent from the prior discussion, but it will now be reviewed briefly. The mounting ring 52 and the spring wires 54 are assembled on the pipe 24 from its outer end and the cone-shaped member 26 and the spacer ring 38 are assembled on the inner end of the pipe 24. The nut 34 is then turned on the threaded end 32 to engage the inner and outer walls 44 and 46 of the cone-shaped member 26 with the stop flange 36, the spacer ring 38, and the nut 34. The outer ends of the spring wires 54 are engaged with the loops 56. This assembly of the elongate pipe 24 and the cone-shaped member 26 is then inserted through the passages 18 and 14 of the connection 12 and through the opening 16 into the header. With the cone-shaped member 26 completely within the header, the sleeve 58 is pushed toward the mounting ring 52 to force the wires 54 outwardly as the mounting ring 52 abuts the stop flange 36. The collar nut 66 is then turned onto the threaded sleeve 64 to force outwardly the flared end 60 of the sleeve 58 against the passage 18 of the connection 12. This forms the seal for the purge gas around the sleeve 58 and also holds the sleeve in position relative to the pipe 24 to maintain the spring wires 54 in their outer, stressed positions to hold the member 26 in the expanded position. The purge gas line can then be connected to the threaded end 30 of the pipe 24 with the purge gas thus supplied to the enclosed zone 28. The end 20 of the connection 12 can then be welded in the usual manner to the header wall 10. With the weld complete, the collar 66 is unthreaded from the sleeve 64 and the sleeve 58 withdrawn or slid outwardly on the pipe 24 to enable the spring wires 54 to move back parallel to the elongate member 24 and collapse the cone-shaped member 26. The member 24 and the member 26 can then be withdrawn from the header through the opening 16 and the passages of the connection 12. Thus, nothing is left in the header to cause possible subsequent contamination and the amount of purge gas is held to a minimum.

By way of example, one of three sizes of the purge unit 22 can accommodate any size of branch connection 12 ranging from ½ to 12 inches. Thus, one size of unit can accommodate connections from ½ to 1½ inches in diameter, a second size can accommodate branch connections from 1½ inches to 3 inches in diameter, and a third size can accommodate branch connections from 3 to 12 inches in diameter.

In some instances, the pressure of the purge gas supplied through the pipe 24 may be sufficient to cause the cone-shaped member 26 to expand outwardly without the use of the spring wires 54 and the mounting ring 52. In that case, when the weld is complete, the elongate member 24 and the cone-shaped member 26 can be withdrawn from the header with the cone-shaped member 26 turned inside out over the threaded end 32 of the member 24. The sleeve 58 also can then be eliminated and the collar nut 66 made of a larger diameter to engage the inner passage 18 of the sleeve 12 and form the outer seal for the purge gas.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. An inert gas purge unit for establishing an enclosed zone around a weld area, said unit comprising an elongate member having passage means to supply purge gas to the enclosed zone, a flexible, expandable member connected to said elongate member and having an edge portion adapted to engage a surface of a workpiece around the weld area to establish the enclosed zone, said expandable member having an inner wall and an outer wall with the space between said inner and outer walls communicating with said passage means in said elongate member.

2. An inert gas purge unit for establishing an enclosed zone around a weld area, said unit comprising an elongate member, a flexible, expandable member connected to said elongate member and having an edge portion adapted to engage a surface of a workpiece around the weld area to establish the enclosed zone, and resilient means mounted on said elongate member and having unstressed positions along said elongate member, said resilient means being connected to said expandable member to urge said expandable member toward said elongate member.

3. An inert gas purge unit for establishing an enclosed zone within a header or the like having an opening to which a branch connection or the like is to be welded, said unit comprising an elongate member, flexible, expandable means connected to said elongate member and having an edge portion adapted to engage the inner surface of the header around the opening to establish an inner enclosed zone around the weld area around the opening, said elongate member having passage means to supply purge gas to the enclosed zone, and said elongate member and said flexible, expandable means having a transverse dimension, when collapsed, which is smaller than a passage in said connection and said opening.

4. An inert gas purge unit for establishing an enclosed zone within a header or the like having an opening to which a branch connection or the like is to be welded, said unit comprising an elongate member, a flexible, expandable member connected to said elongate member and having an edge portion adapted to engage the inner surface of the header around the opening to establish an inner enclosed zone around the weld area around the opening, said elongate member and said expandable member having a transverse dimension, when collapsed, which is smaller than a passage in said connection and said opening, and resilient means mounted on said elongate member and having unstressed positions along said elongate member, said resilient means being connected to said expandable member to urge said expandable member toward said elongate member.

5. An inert gas purge unit for establishing an enclosed zone within a header or the like having an opening to which a branch connection or the like is to be welded, said unit comprising an elongate member, a flexible, expandable member connected to said elongate member and having an edge portion adapted to engage the inner surface of the header around the opening to establish an inner enclosed zone around the weld area around the opening, said elongate member and said expandable member having a transverse dimension, when collapsed, which is smaller than a passage in said connection and said opening, and means associated with a portion of said elongate member adjacent the branch connection for forming a seal between said elongate member and the branch connection.

6. A purge unit according to claim 1 characterized by said inner wall having openings positioned to communicate with the enclosed zone.

7. A purge unit according to claim 1 characterized by said expandable member being of generally cone-shaped configuration.

8. A purge unit according to claim 7 characterized by said edge portion of said cone-shaped member having a heat-resistant, flexible flange thereon.

9. A purge unit according to claim 2 characterized by said resilient means comprising a plurality of resilient members.

10. A purge unit according to claim 9 characterized by a sleeve mounted on said elongate member and being effective to urge said resilient members outwardly away from said elongate member.

11. A purge unit according to claim 3 characterized by said expandable means having an inner wall and an outer wall with the space between said inner and outer walls communicating with said passage means in said elongate member.

12. A purge unit according to claim 11 characterized by said inner wall having openings communicating with the enclosed zone.

13. A purge unit according to claim 3 characterized by said expandable means being of generally cone-shaped configuration.

14. A purge unit according to claim 13 characterized by said edge portion of said cone-shaped means having a heat-resistant, flexible flange thereon.

15. A purge unit according to claim 4 characterized by said resilient means comprising a plurality of resilient members.

16. A purge unit according to claim 15 characterized by a sleeve mounted on said elongate member and being effective to urge said resilient members outwardly away from said elongate member.

17. A purge unit according to claim 16 characterized by means associated with said sleeve for forming a seal between said sleeve and the branch connection.

18. A purge unit according to claim 5 characterized by said seal-forming means comprises a collar nut engageable with said elongate member adjacent the branch connection.

* * * * *